Feb. 25, 1958 M. G. JACOBSON ET AL Re. 24,436

SENSITIVE HEAT EXCHANGE DETECTOR

Original Filed April 10, 1952 4 Sheets-Sheet 1

INVENTORS
MOSES G. JACOBSON,
JAMES C. GILFERT,
FRANK J. DeLUCA,
WALTER F. MRUK,
BY
John B. Brady
ATTORNEY SENSITIVE HEAT EXCHANGE DETECTOR
Original Filed April 10, 1952 4 Sheets-Sheet 2
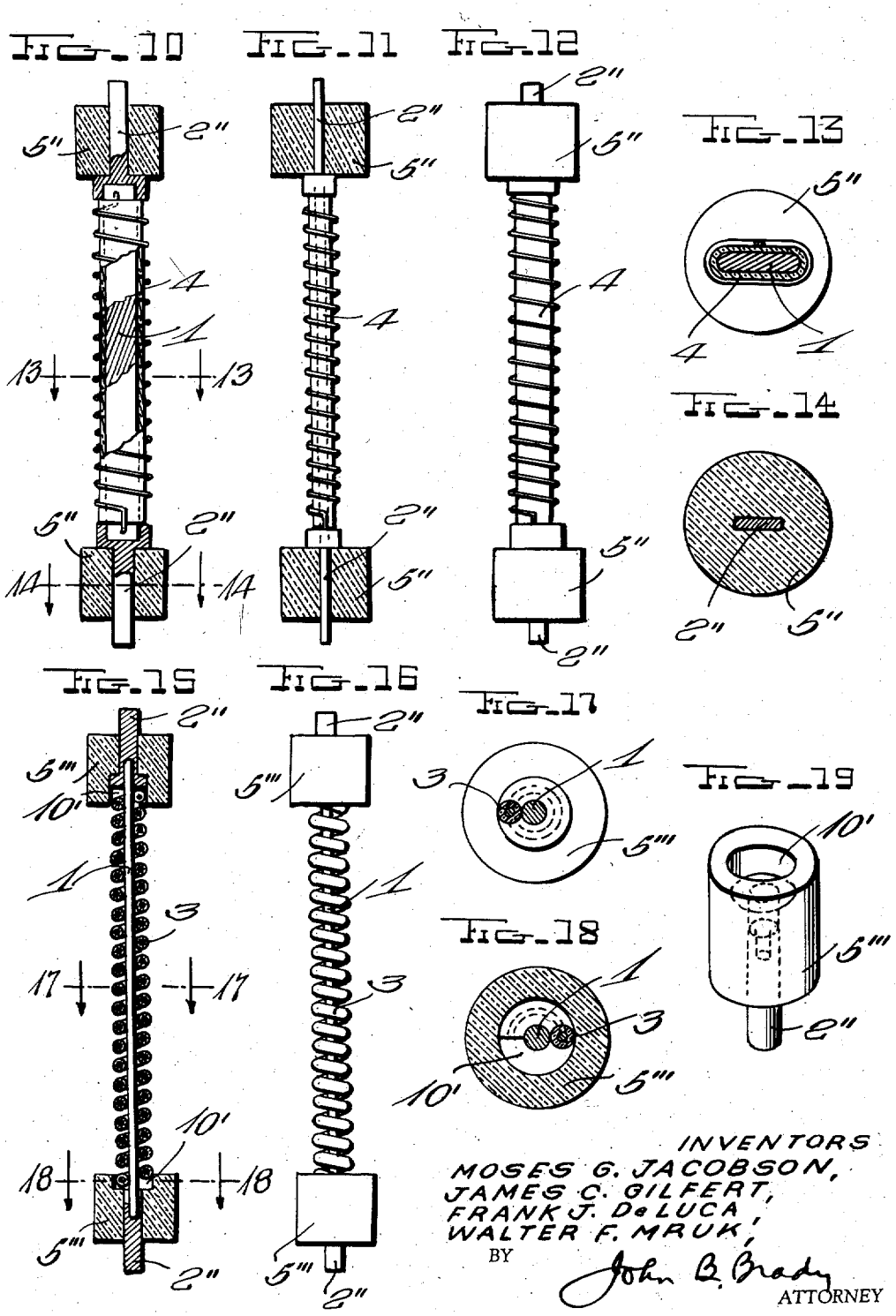
INVENTORS
MOSES G. JACOBSON,
JAMES C. GILFERT,
FRANK J. DeLUCA,
WALTER F. MRUK,
BY John B. Brady
ATTORNEY

SENSITIVE HEAT EXCHANGE DETECTOR

Original Filed April 10, 1952 4 Sheets-Sheet 3

INVENTORS
MOSES G. JACOBSON,
JAMES C. GILFERT,
FRANK J. DeLUCA,
WALTER F. MRUK,
BY John B. Brady
ATTORNEY

SENSITIVE HEAT EXCHANGE DETECTOR

Original Filed April 10, 1952 4 Sheets-Sheet 4

INVENTORS
MOSES G. JACOBSON,
JAMES C. GILFERT,
FRANK J. DeLUCA,
WALTER F. MRUK,
BY John B. Brady
ATTORNEY United States Patent Office Re. 24,436
Reissued Feb. 25, 1958

24,436

SENSITIVE HEAT EXCHANGE DETECTOR

Moses G. Jacobson, Penn Township, Allegheny County, Pa., James C. Gilfert, Columbus, Ohio, and Frank J. De Luca, Pittsburgh, and Walter F. Mruk, McKees Rocks, Pa., by Mine Safety Appliances Co., Pittsburgh, Pa., assignee Original No. 2,769,884, dated November 6, 1956, Serial No. 281,632, April 10, 1952. Application for reissue November 6, 1957, Serial No. 697,298

9 Claims. (Cl. 201—63)

Matter enclosed in heavy brackets [ ] appears in the original patent but forms no part of this reissue specification; matter printed in italics indicates the additions made by reissue.

Our invention relates broadly to heat exchange measurements and more particularly to an improved construction of an electrical sensitive heat exchange detector.

One of the objects of our invention is to provide an electrically operated detector with improved heat exchange characteristics and in consequence thereof with higher sensitivity.

Another object of our invention is to provide a sensitive heat exchange detector which will not reflect all random temperature fluctuations as rapidly as they may occur, but will integrate them into an average value over a small time interval congruent with the period of the indicating meter and the particular practical application.

A further object of our invention is to provide a detector element whose sensitivity will be largely independent of its angular position in space and relative to a container wall, which is especially important for anemometers, flowmeters, thermoconductivity meters, etc.

Still another object of our invention is to provide a construction of a detector element which is sturdy, rigid and of great durability and which will stand up under the severe conditions of use to which many industrial instruments are subjected, yet will have a sensitivity as high or higher than those heretobefore used only in laboratories.

Figure 1:
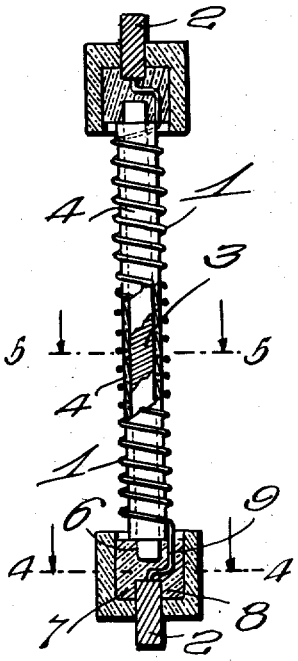
Figure 2:
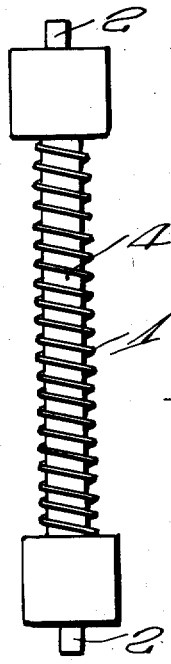
Figure 3:
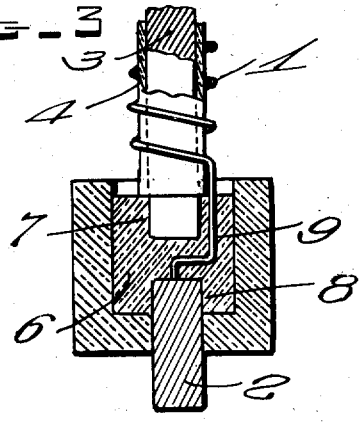
Figure 4:
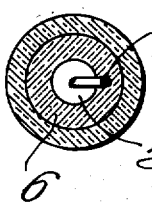
Figure 5:
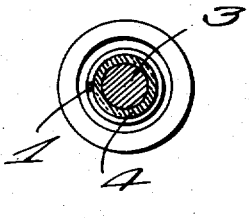
Figure 6:
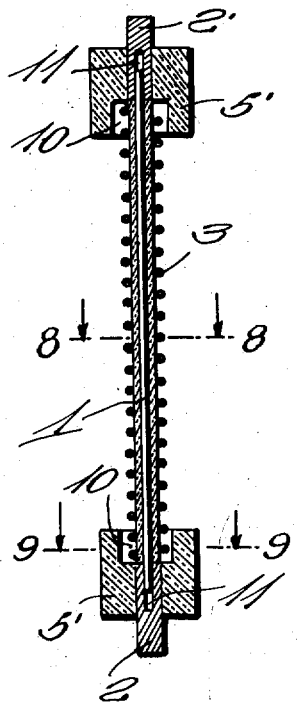
Figure 7:
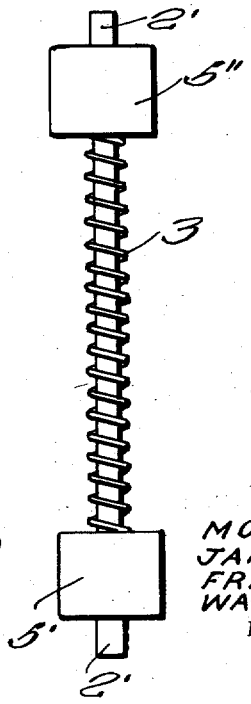
Figure 8:
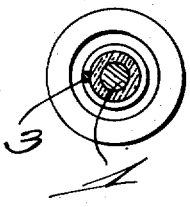
Figure 9:
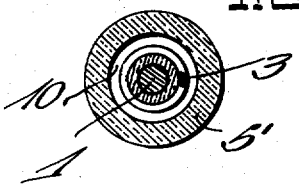
Figure 20:
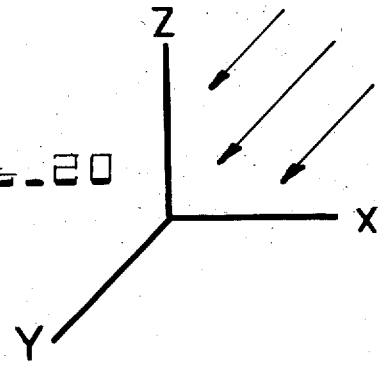
Figure 21:
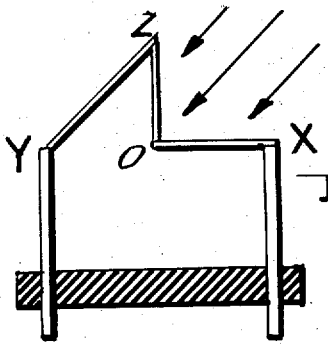
Figure 22:
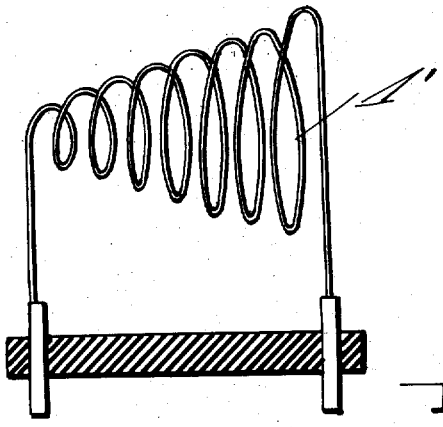
Figure 24:
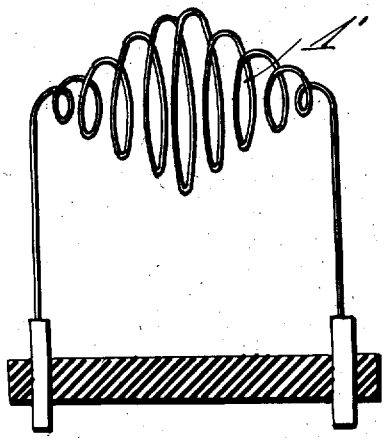
Figure 23:
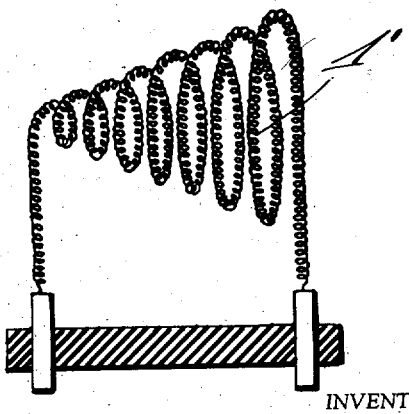
Figure 25:
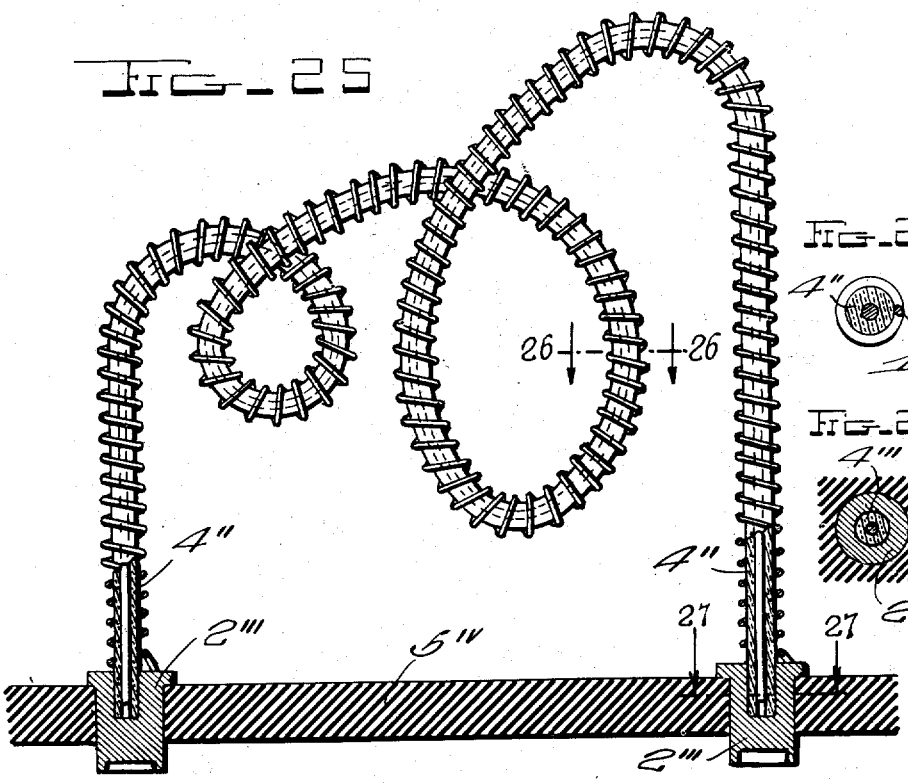
Figure 26:
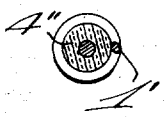
Figure 27:
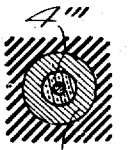
Figure 29:
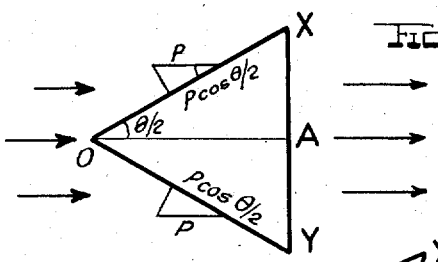
Figure 28:
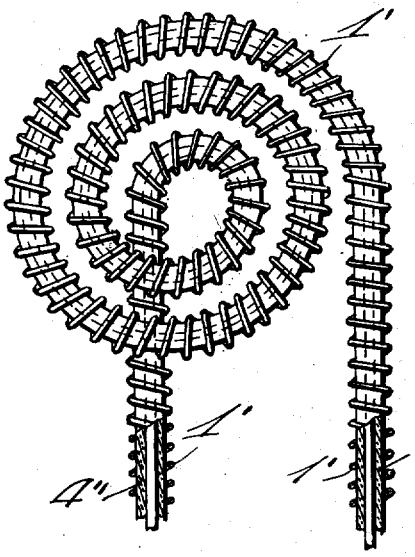
Figure 30:
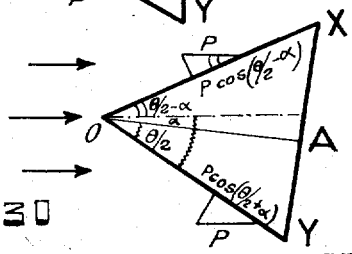

Other and further objects of our invention reside in the compact construction and assembly of parts of a heat exchange device as set forth more fully in the specification hereinafter following by reference to the accompanying drawings, in which:

Figure 1 is a longitudinal sectional view through one embodiment of our invention; Fig. 2 is an elevational view of the form of our invention illustrated in Fig. 1; Fig. 3 is an enlarged fragmentary sectional view showing one end of the device illustrated in Figs. 1 and 2; Fig. 4 is a transverse sectional view taken on line 4—4 of Fig. 1; Fig. 5 is a transverse sectional view taken on line 5—5 of Fig. 1; Fig. 6 is a longitudinal sectional view taken through a modified form of our invention; Fig. 7 is an elevational view of the form of the invention illustrated in Fig. 6; Fig. 8 is a transverse sectional view taken on line 8—8 of Fig. 6; Fig. 9 is a transverse sectional view taken on line 9—9 of Fig. 6; Fig. 10 is a longitudinal sectional view through another modified form of our invention, the view showing the high temperature coefficient of resistance conductor in front elevation; Fig. 11 is a view similar to the view shown in Fig. 10, but illustrating the conductor in side elevation; Fig. 12 is an elevational view of the form of our invention shown in Figs. 10 and 11; Fig. 13 is a transverse sectional view taken on line 13—13 of Fig. 10; Fig. 14 is a transverse sectional view taken on line 14—14 of Fig. 10; Fig. 15 is a longitudinal sectional view taken through a further modified form of our invention; Fig. 16 is an elevational view of the form of our invention shown in Fig. 15; Fig. 17 is a transverse sectional view taken on line 17—17 of Fig. 15; Fig. 18 is a transverse sectional view taken on line 18—18 of Fig. 15; Fig. 19 is a perspective view showing one of the end retainers employed in the form of our invention shown in Figs. 15–18; Fig. 20 is a theoretical view explaining the principle of our invention; Fig. 21 shows an embodiment of our invention in a detector element employing the principle illustrated in Fig. 20 and which we have used to establish experimentally the validity of this principle; Fig. 22 illustrates one of the practical embodiments of our invention in a heat sensitive detector; Fig. 23 illustrates a further modified form of heat sensitive detector embodying our invention; Fig. 24 shows still another form of heat sensitive detector constructed in accordance with our invention; Fig. 25 is a perspective view of a conically arranged heat sensitive device embodying our invention for application as a flow indicator and anemometer element; Fig. 26 is a transverse sectional view on line 26—26 of Fig. 25; Fig. 27 is a transverse sectional view on line 27—27 of Fig. 25; Fig. 28 is a view showing a projection of the detector element of Fig. 25 onto a plane perpendicular to the axis of the cone shown in Fig. 25; and Figs. 29 and 30 are theoretical diagrams explaining the theory of our invention.

Our invention is directed to the general class of instruments in which the electrical resistance of a conductor of electricity is changed by a variation in the temperature of the conductor caused by heat exchange between it and a surrounding medium. This heat exchange may take the form of heat being carried away from the conductor by a fluid moving past it as in anemometers or flowmeters or convection indicators, or it may take the form of heat being carried away by thermoconductivity of a surrounding gas or liquid as in instruments for gas or vapor analysis by thermoconductivity. It may also take the form of heat being absorbed by the conductor from the medium, which in turn is heated by combustion of one of its constituents or by absorption of infrared or other radiation or from another source of heat located in the medium as in calorimeters or Thomas meters. Or the heat exchange between the element and another body may take place solely by [omission] *emission* or absorption of radiant energy, as in spectrometers, optical pyrometers, etc.

The simplest form in which such elements are applicable is a resistance thermometer; in this application as in many others conditions must be so arranged that the heat transferred from or received by the medium to or from the detector will not change the temperature of the medium to any considerable extent, while changing the temperature of the detector to the greatest possible extent. In general, in all these applications the efficiency of the heat transfer process is of major importance. Our device improves these heat transfer conditions and provides a better detector element than has heretofore been known in the art.

Although, as hereinbefore pointed out, there are many applications for our heat exchange detector, the detailed description hereinafter following will be given with reference to fluid flow and velocity indicators, for which specific purpose our preferred embodiment was developed.

Heretobefore, it has been customary to use for these detector elements thin wires of materials with relatively high specific electrical resistances and with temperature coefficients as high as possible. For the material of these wires, platinum, tungsten and palladium were used most frequently. The elements are made up in most cases either in the shape of relatively long substantially straight pieces of wire, or in the form of small coils. Both of these forms are lacking very much in strength, especially when in order to obtain proper operation and sufficient sensitivity they have to be heated during their normal use to rather elevated temperatures. To provide greater strength in some of the applications (as for instance in thermoconductivity cells), the wire surface is covered with thin layers of glass or enamel; and in other applications, especially in cases where the wire has to be used in or near the state of incandescence, it has been proposed to wind resistance wire coils on rigid mandrels of some ceramic material, hard glass rods or the like. In both of these cases, the improvement in mechanical strength is obtained at the cost of considerable sacrifice in sensitivity. Moreover, the poor thermal conductivity of the glass covering, and especially of the ceramic mandrels, causes a very considerable slowing down of the heat exchange between the medium and the detector element and a slow creeping of the indications towards the equilibrium indication.

It has also been proposed to wind the resistance wire on a metal mandrel with a layer of glass or other insulating material between them, and to use the mandrel itself as one of the lead wires, while this is undoubtedly better with respect to lag and creeping action than the ceramic or mandrels of other insulating materials, nevertheless, all the foregoing composite detector constructions are directed to the obtaining of mechanically strong elements and so far as we are aware, the influence of such composite construction of these detector elements on either the heat exchange conditions or on the electrical characteristics or on the resulting sensitivity and time lag conditions has not heretofore been considered. Our investigation and experiments have shown that these influences are very considerable, and by properly applying the results of our investigation, considerable improvements have been obtained in the performance of heat exchange devices.

The basic ideas of our improvement are as follows:

When an electric current I is passing through a wire *of* diameter d and length l and having specific electric resistance $\rho$ and temperature coefficient of resistance $\alpha$, a quantity of heat $$Q_1=.24I^2\rho[1+\alpha(T-T_0)]\frac{4l}{\pi d^2} \qquad (1)$$

is developed in every unit of time, where T and $T_0$ are the temperatures of the wire and of the surrounding medium respectively. When temperature equilibrium is reached—which is indicated by the fact that an electric meter connected in shunt or in series or in a Wheatstone bridge circuit with the heated wire is maintaining a constant deflection—this quantity of heat developed is exactly balanced by the heat lost through the surface of the wire by thermoconductivity, convection and rediation and in general also by thermal conductivity through the wire terminals [of] *or* the so called end losses. However, in the great majority of applications of this invention, the end losses are very small and to a first approximation may be neglected. Substantially, then, all the heat loss takes place through heat exchange between the surface of the wire and the surrounding medium. This heat lost can be expressed by the formula:

$$Q_2=\pi dlhf(T-T_0) \qquad (2)$$

where h, which we shall call the heat transfer constant, is the heat given off to (or in general exchanged with) the surrounding medium through one unit of surface area; this quantity h is a function of the thermal characteristics (thermal conductivity, specific heat, etc.) of both the wire and the surrounding medium and of the condition of the boundary surface between the two; in the case of any relative motion between the medium and the wire (as in anemometers and flowmeters), h is also a function of the velocity of that motion. The function $f(T-T_0)$ expresses the temperature dependence of the heat transfer. When T the temperature of the heated wire is not more than 80–100° C. above the temperature of the medium $T_0$, this function can be adequately expressed by Newton's law of cooling, that is by a linear quantity of the form $(T-T_0)$ where h is a constant coefficient for a given wire and a given medium. For higher temperature differentials the reltaionship is no longer linear, but is still a rising function of $T-T_0$.

When equilibrium is reached, we have the following equation between heat developed—$Q_1$, and heat transferred—$Q_2$ in every unit of time:

$$.24I^2\rho[1+\alpha(T-T_0)]\frac{4l}{\pi d^2}=\pi dlhf(T-T_0) \qquad (3)$$

from this we obtain:

$$\frac{f(T-T_0)}{1+\alpha(T-T_0)}=.96I^2\rho\frac{(l)}{\pi d^2}\frac{1}{\pi d(l)}\left[\frac{1}{L}\right]\frac{1}{h} \qquad (4)$$

This equation relating to a single straight or a coiled filament has enabled us to achieve a number of improvements in the development of single wire filaments. Let us now proceed a step farther and develop an equilibrium equation for the case when—as in the present invention—a length of resistance wire l of diameter d with a specific resistance $\rho$ and high temperature coefficient of resistance $\alpha$ is used not suspended freely in space and supported only by two terminals, but is tightly wound around a mandrel wire of the same material of length L and diameter D, e. g. Let us suppose for the time being that both wires are covered with a thin layer of the same insulating material. The heat transfer constant per unit area and unit temperature differential will be the same for both the resistance wire and the mandrel. Also the temperature dependence function $f(T_1-T_0)$ will be the same for both surfaces. The heat equilibrium equation, now will be:

$$\frac{f(T_1-T_0)}{1+\alpha(T_1-T_0)}=.96I_1^2\rho\frac{1}{\pi d^2}\frac{1}{\pi D_1L}\left[\frac{1}{L}\right]\frac{1}{h} \qquad (5)$$

where $$D_1=\left(D+\frac{2dm}{n}\right)$$

and m/n has a maximum value of 1, when the convolutions of the resistance wire covers the entire length of the mandrel without any interspaces. Comparing Equation 5 with Equation 4 we see that first of all, while in Equation 4 the total length l of the wire cancels out, it does not cancel out in 5. That means that by winding the wire on the mandrel, we acquire another parameter which we can vary in order to improve the performance of the complete unit. To investigate the situation farther, we find the ratio of electrical currents $I_1/I$, which will give us equal temperature differentials $T_1-T_0=T-T_0$ with $$\frac{I_1^2}{I^2}=\left[\frac{D_1}{\alpha}\right]\frac{D_1}{d}\frac{L}{l} \qquad (6)$$

From (6) we deduct that by choosing a mandrel of such a diameter D that $D_1$ becomes for instance nine times larger than the diameter of the resistance wire d, we can have the same temperature in our element with a more than three times larger electric current or with over nine times the electric power—provided the lengths L and l are equal. By making L larger than l we could increase this ratio still further.

These detector elements are almost always used in Wheatstone bridge circuits; to increase the electrical sensitivity it is necessary to increase the voltage applied to the bridge and thus also the electric current through the element; with elements made of single wires, the rapid temperature increase with electric current puts severe limitations to the electric currents that can be safely and practically used. While with the resistance wire wound tightly on a heat conducting mandrel, we see now that much higher electric currents can be used without getting out of a safe temperature range.

In cases where it is desirable for reasons of current and voltage economy to obtain the same temperature range with smaller electric currents—as in many portable battery powered instruments—the new arrangement also offers considerable advantages: to make $I_1$ smaller than I for the same $T-T_0$, all we have to do according to Equation 6 is to make the ratio $D_1L/dl$ small: while $D_1$ cannot be made smaller than d, L can be made so much smaller than l that $D_1L$ becomes considerably smaller than dl.

Let us now go farther and investigate what might be called the thermal sensitivity of a composite detector element, and whether we do not lose the advantage gained from the increase in electric sensitivity by the increase of the electric current by any possible decrease in the heat transfer characteristics; for example, in a detector element for a flowmeter, the question may arise whether the amount of cooling in unit time per unit area of surface and per unit temperature differential does not become smaller when we change from a single wire element to a two or multiple wire element. Our theoretical study shows that [L] *h* should remain substantially unchanged provided a small enough unit is chosen for area measurement. As to the net total effect of changing over from a single wire element to a composite element of exactly equal surface area and everything else the same, some changes can be expected due to the change in the macrostructure of the surface: the single wire has an even geometrical surface, while a composite element generally has a surface consisting of small hills and dales; while in some applications, such as thermoconductivity detectors, this can be expected to favor the total heat exchange; it will in other applications, such as in flow indicators, somewhat decrease it. Although accurate comparison tests on this point are very difficult, indirect observations have definitely established that this effect is quite small, not more than 25%; while the gains obtainable by the composite construction from the increase in electrical sensitivity are of the order of several hundred percent.

The conclusions drawn from the foregoing mathematical presentation shows that a composite element consisting of a long and relatively thin resistance wire intimately joined together in thermal but not electrical contact with another wire or body of high thermal conductivity provides not only a mechanically stronger detector element, but also, by virtue of the greater increased surface available for heat exchange, provides the possibility of greatly increasing the available electric power at the same working temperature. Returning to [Equation 5] *Equations 4 and 5* we see that this increase in electric power is made possible:

(a) By being able to use much higher electrical currents, (b) By increasing the electrical resistance, by using resistance wires of much greater length and smaller diameter without fear of them bulging out or otherwise changing their shape or position or burning out from accidental overloads.

There is one more factor that favors the composite construction which we have not yet explained. It is always the desire of designers of temperature sensitive resistance elements to use wire not only with the highest possible temperature coefficient but also of the highest possible specific resistance $\rho$—in order to have available the highest possible electric power and by virtue of it the highest possible sensitivity. But unfortunately with the increased specific electrical resistance always goes also increased thermal resistance or decreased thermal conductivity; and thus a great deal of the gain by increase in $\rho$ is lost because of the decreased thermoconductivity. In our composite element we use a resistance wire of the highest available specific resistance as well as of very small diameter because the loss in thermal conductivity caused by this will be amply restored by the use of a mandrel wire of a material of high thermal conductivity such as gold or silver or copper. Thus by using for the mandrel, materials of high thermal conductivity instead of the same material as in the resistance wire—as was assumed temporarily hereinbefore for the sake of simplicity—a further advantage is gained, which was not realized heretobefore.

As mentioned above, the heat transfer constant h in general is affected also by the specific heat of the material; however, when using metals on an equal volume basis this factor can be neglected; for, according to the law of Dulong and Petit, specific heats of all metals are such that their molecular heat capacities (specific heat times molecular weight) are very nearly equal, and hence their thermal capacities when taken in equal volumes are very nearly equal. Therefore, in selecting materials for the composite detector elements, only the electrical resistance characteristics for the resistance wire and only the thermal conductivity for the mandrels will be the determining factors.

In the great majority of applications of heat exchange instruments, a very fast response is not only not an advantage but very detrimental; for instance, an anemometer or airflow indicator with a response time of .1 second would be entirely useless for measurement of ventilation currents in mines and air conditioning [dusts;] *ducts;* for, even in a well regulated tunnel, it is difficult to keep rapid fluctuations in the air velocity down to a few percent, and in actual air flow measurements it is very seldom that these fluctuations do not amount to 10% or more of the measured value. If an instrument even with a response time near a second was used, the pointer of the indicating meter would fluctuate all the time and make it quite difficult to make a reading. On the other hand, if the response time is of the order of 5–15 seconds, a reading is easily obtained, and as long as this response time remains constant, obviously, a consistent and true average indication is obtained. In copending application Serial Number 41,347, filed July 29, 1948, by Moses G. Jacobson, now Patent 2,694,928, issued November 23, 1954, for Electrical System for Measuring the Rate of Motion of a Fluid, the various conditions and factors determining the time constant of heat responsive detector elements are set forth, and a number of novel features claimed to which reference is made for details of the time constant features of general interest herein. It will suffice to state here, that as our experience has shown, composite detector elements of the construction described in this application can easily be made with time constants of one second and higher. The time constants of the preferred detector elements described hereinafter is of the order of five–six seconds.

Our invention may be embodied in various forms as set forth in detail in the drawings which show the several forms approximately 20 to 50 times enlarged with respect to the natural size of the actual units and the dimension of the insulation layers is exaggerated with relation to other parts.

In Figs. 1 to 18 and 25 to 28 reference character 1 designates a wire or electric conductor of a relatively high electric resistance and with a high temperature coefficient of resistance; reference character 2 designates terminals of high electric conductivity to which the two ends of the wire or conductor 1 are joined by soldering, welding or any other known means of securing a permanently good electrical connection. Reference character 3 designates a bar or wire made of a material of high thermal conductivity, such as gold, silver, or copper. The numeral 4 designates a thin layer of electrical insulation such as, for instance, Glyptal, Formvar, or the like, the layer providing good electrical insulation while heated to temperatures of 150° C., yet retain their flexibility and low resistance to heat transfer. The four modifications of Figs. 1 to 18 and Figs. 25 to 28 are shown not for the purpose of describing all possible varieties of construction; many more modifications are possible, and thus they should not be considered as limitations in any way except as set forth in the claims.

By comparing Figs. 1 to 5; Figs. 6 to 9; Figs. 10 to 14; and Figs. 15 to 18 with each other, it will be seen that reference character 1 which is the member, that serves to carry the electric current for heating the entire element and for having its change of electrical resistance measured may have the form of a relatively thin wire as in Figs. 1–5 and in Figs. 15–18, but it also may have the shape of a rod or bar of considerable cross section as in Figs. 6–9 and Figs. 10–14; the latter will usually be the case, if semi-conductors and especially those of the kind called thermistors or negative temperature coefficient resistors are used. The member [4] *3* used for conduction of the heat also can be either in the form of a wire as in Figs. 6–18, or in the form of a bar or rod as in Figs. 1–5. In Fig. 1 the electric conductor 1 is wound around a bar or rod-shaped heat conducting member 3 and they are separated by a thin layer of insulation 4 on member 3. In Figs. 6–18, the electrical conductor is on the inside, and the heat conductor 3 on the outside. The electrical insulation layer 4 in Figs. 6–14 is put on the electrical conductor, while in Figs. 15–18 the electrical insulation 4 is put on the heat conductor 3. The insulation may also be put on both members in certain applications.

These modifications bring out the following facts:

(a) It is immaterial whether the electric conductor member is on the outside of the unit and heat conductor on the outside, or vice versa.

(b) It is immaterial whether the electric conductor is thin and the heat conductor of considerable cross section, or vice versa.

(c) The layer of electrical insulation may be on either of the two members or on both.

(d) Usually the thinner of the two members is wound around the one of larger cross section, irregardless of which is the conductor for electricity and which the heat conductor. However, that is not necessary either, as shown in Figs. 15–18 where a heat conductor of larger cross section is wound around a thinner electrical conductor. In certain applications the electrical and heat conductor are intertwined with each other. The selection of these modified forms depends on the particular application and the convenience of construction. The features common to all of the several forms are recited concisely in the claims. In each instance a mounting is provided for the composite conductors in the form of cylindrical end members of insulation material shown at 5. The manner of mounting the composite conductors in the end members 5 differs in the different forms of the device. In Figs. 1–5 the end member 5 is axially apertured to receive the terminals 2. In this form of our invention the ends of the wire 3 are countersunk into short cylindrical blocks of insulation material 6 as shown at 7. The terminals 2 are countersunk into the opposite ends of the blocks 6 as shown at 8. The blocks 6 are apertured at 9 to provide a passage for the end of the conductor which connects to the terminal 2. The structure at each end of the device is symmetrical so that we have described but one terminating end in detail.

In the form of our invention shown in Figs. 6–9, the end members of insulation material are shown at 5' recessed at 10 for centering the end convolutions of the heat conducting member 3. The end members 5' are axially recessed to center the terminals 2' that extend therethrough. The terminals 2' are internally recessed at 11 to receive the ends of the wire or conductor 1.

In the form of our invention shown in Figs. 10–14 the conductor 1 is shaped as a thin bar or strip, the opposite ends of which are secured in terminal members 2'' that project through supporting end members of insulation material shown at 5''.

In the form of our invention shown in Figs. 15–18, the end members are shown at 5''' mounting terminals 2'' in much the same manner as in Figs. 6–9, except that the recess at 10' is enlarged to receive and support the end convolutions of the insulated covering of the conductor 3.

One of the big shortcomings of straight wire and cylindrical coil detector filaments, is the fact that they are very much dependent on their position in space as well as with respect to the walls of their housing; a displacement of the detector element in the housing or of the entire unit including the housing to the extent of only a few degrees in any direction from the original position, may change the indication very considerably; these changes are indeed so big that such detector elements were used to determine the angular location of a body carrying them in space, or to find the direction of a wind or air current. This fact is especially annoying when the detector unit is to be used in a portable anemometer, since it is difficult in actual use in a mine, or in a ventilation duct always to orient the detector so that it is facing the air current in a definite position with an accuracy of better than 4°–5° angular degrees.

To overcome this difficulty, in an earlier form of an anemometer which we developed, we used a detector element of a spherical shape; a sphere being a body of an absolute geometrical symmetry, and one in which the convection current as well as the thermoconductivity losses to the walls which are responsible for the changes caused by orientation are not changed by any angular displacement of the element. However, a detector element of spherical shape proved difficult and expensive to manufacture with sufficient accuracy and, therefore, another basic principle was adopted, which not only gives sufficient independence from orientation, but also affords greater sensitivity for the measurement of low velocity air currents. Let us first make reference to a detector element as shown in Fig. 21, consisting of three equal lengths of resistance wire bent at right angles to each other, in space, so that when one of them OX is in the direction of the X axis of a rectangular system of space coordinates, the other length OZ is in the direction of the Z axis, and the third ZY in the direction of the Y axis; to simplify the explanation, let us assume that this detector is placed in a moving fluid in such a way that the fluid moves in a direction parallel to YZ or the coordinate YO. Any rotation of the unit around the YO axis will produce no change whatsoever in the cooling conditions. The amounts of cooling produced by the fluid flow on OZ and OX are equal. Now let the unit be turned around, for example, the axis OX by an angle $\alpha$; nothing will change in the cooling conditions of OX, but YZ will no longer be parallel to the flow and it will be cooled less; on the other hand OZ, which was before perpendicular to the flow direction, which produces a minimum of cooling, will now be turned at an equal angle to the wind, and its cooling will be increased. But this increase and this decrease are substantially equal, and thus again there will be no change in the cooling of the entire detector unit. It can be shown, and was confirmed by our tests, that a detector unit of this construction will be independent of any orientation in space to the same extent as one of spherical shape, even though no special care is taken to place it symmetrically with respect to the direction of fluid flow.

However, a unit of this shape is difficult to make sturdy enough for field use, and also does not easily lend itself to the composite construction, hereinbefore described, which provides so much greater sensitivity. We have, therefore, developed a detector of conical shape, as shown in Figs. 22 to 24, which easily can be made up in the composite way hereinbefore described. Using one of the shaped self-sustaining elements 1' of Figs. 22 and 23 we then produced our preferred embodiment for a fluid flow detector shown in Figs. 25 to 28. Fig. 24 shows an embodiment of our invention in which the conductor is formed in a compound helix and which may be associated with the coacting conductor in any of the several arrangements heretofore explained.

To prove that a detector of conical shape under certain conditions also possesses a great deal of positional independence and to determine the conditions and limitations prevailing, let us turn to Figs. 29 to 30. In these views OXY represents a cross section of any of the conical units shown in Figs. 22 to 24 inclusive. The angle at the apex is equal $\theta$, which we for the present shall subject only to the condition that it is less than 180°. The fluid motion is horizontal, and so in the original position is the axis OA of our conical detector unit. The cooling action on OX as well as on OY from a velocity vector P, will be proportional to P cos $\theta/2$, as follows from Fig. 29; thus the total cooling action will be proportional to 2P cos $\theta/2$. Now let us turn our detector element by an angle $\alpha$ with respect to its original position or to the fluid motion, which is assumed to be the same as before in every respect. Now as shown on Fig. 30 the cooling components for the same velocity vector P will be P cos $(\theta/2-\alpha$ and P cos $(\theta/2+\alpha)$ respectively. The sum of the two now is equal $$P[\cos(\theta/2-\alpha)+\cos(\theta/2+\alpha)]$$

which by the trigonometrical formula for the sum of cosines becomes equal to 2P cos $\theta/2$ cos $\alpha$. Comparing this with the original total cooling effect 2P cos $\theta/2$, we see that the difference is 2P cos $\theta/2$ $(1-\cos\alpha)$. From trigonometrical tables we find that $(1-\cos\alpha)$ will become equal to .05 [and] *or* 5% only when $\alpha$ reaches 18°; thus theoretically our detector element may be turned as much as 18° without affecting the indication by more than 5%. If we set 2% as the limit of permissible error, instead of 5%, $\alpha$ is equal 11°, which is an angular deviation still easy enough to observe by eye. In actual experiments—especially for units built according to the prescriptions given hereinafter for our preferred embodiment of the invention—conditions in this respect are still somewhat better, due to the additional symmetry afforded by the fluid passing between the windings through the inside of the cone; according to tests on these units, it takes angular deviations over 15° to introduce errors of more than 2%.

It may be seen by observing Fig. 30, that the maximum feasible value of angle $\alpha$, is $\alpha=\theta/2$; it follows that if we specify that it should be possible to turn our detector unit by about 20 degrees without abruptly introducing a large error, the cone must have an apex $\theta$ of at least 40°; if a cone with this apex were turned more than 20° the cooling of the side OX, will rapidly decrease from its maximum value, which it had reached when OX became parallel to the wind direction when $\theta/2-\alpha=0$. For similar reasons it is not desirable to make the apex of an angle $\theta$ more than $180°-40°=140°$.

It should be noted, that while with the spherical and three-coordinate shapes of detector units, the original position is immaterial, a conical shaped detector unit when used for fluid flow measurements for best results should originally be placed with the axis of the cone substantially parallel to the direction of the fluid flow; exception to this are detectors shaped in the form of double cones with a common base as in Fig. 23, which may be placed originally in any position; also, when the detector elements are not used for flow measurements, but to determine temperatures, thermoconductivity or other thermal exchange values in a stationary medium any of the cone shaped elements does not need definite orientation. For thermoconductivity detectors and other thermal exchange units where the surrounding medium is stationary or the effect of its motion is negligible, all the modifications shown in Figs. 22 to 28 will give good results. For anemometer or fluid flow detectors we have found the embodiment shown in Figs. 25 to 28 preferable to others.

Although any of the basic composite elements shown in Figs. 1–18 might be used, in the embodiment shown on Figs. 25–28 the basic element of Fig. 1 with some minor changes is used; the terminals 2'' ' to which the resistance wire 1' is electrically connected instead of being solid, are now tube shaped as shown at 2'' '; the part with high thermoconductivity is now extended somewhat beyond the windings of the resistance wire 1' inside of the tubular terminals 2'' ' and surrounded by a substantial layer of a plastic insulating and cementing material 4'' to form a mechanically strong and well insulated—thermally as well as electrically—joint with the terminals 2'' ' and base plates $5^{iv}$. The composite electric and heat conductor is wound into the shape of a cone with an angle about 60°. To give the unit the highest possible sensitivity, the consecutive turns of the spiral which is the projection on a plane perpendicular to the cone's axis (and thus also to the flow), must be spaced—as shown on Fig. 28—in such a way that the width of the empty interspaces in any direction perpendicular to the flow is equal or larger than the overall diameter of the composite conductor; then, fluids, moving at not too high velocities, will travel not only along the outside of the detector element, but also through the inside and between the interstices and, thus, the cooling action will be greatly increased. As long as this condition is fulfilled, the maximum number of turns is limited only by the size of the completed unit. The minimum obviously is one complete turn.

The number of actual turns in a completed detector unit, will depend on the size of the composite electric-heat conductor used, and the latter will in turn depend on the sizes of the heat and electrical conductors used. One of our actual detector units of this type consists of two inches of a .002'' diameter nickel alloy wire, known under the trade name of Hytemco, wound around a 2'' length of number 30 copper wire with Formex insulation; this assembly is wound into the shape of a conical unit of about 60° apex, and ⅛'' side and base diameter; there are about three spiral convolutions. The entire assembly is coated with a thin layer of Glyptal, baked on at 125° C., which makes it a single unit of great strength and durability, yet also of high sensitivity. This unit when used as an anemometer, gives sufficient sensitivity to cover a range of from 10 feet to 150 feet per minute of air velocity with less than 3 volts across the Wheatstone bridge circuit of which it is a part. When used as a flow indicator, a full scale deflection [of] *from* 100 cubic centimeters per minute of air flow is easily obtained.

What we claim as new and desire to secure by Letters Patent of the United States is:

1. A sensitive element for the measurement of heat exchange with a surrounding medium comprising: a flexible member with a high temperature coefficient of electrical resistance, two terminals electroconductively joined to the ends of said member for leading electric current to and from said member, a flexible member of high thermal conductivity, a thin layer of electric insulation on one of said members, one of said members being tightly coiled around the other member to form a substantially solid composite element of high thermal and relatively low electrical conductivity and said composite element being wound in the shape of a conical coil.

2. A sensitive element for the measurement of heat exchange with a surrounding medium comprising: a flexible member with a high temperature coefficient of electrical resistance, two terminals electroconductively joined to the ends of said member for leading electric current to and from said member, a flexible member of high thermal conductivity, a thin layer of electric insulation on one of said members, one of said members being tightly coiled around the other member to form a substantially solid composite element of high thermal and relatively low electrical conductivity and said composite element being wound in the shape of a conical coil with an apex of between 40 and 140 angular degrees.

3. A sensitive element for the measurement of heat exchange with a surrounding medium comprising: a flexible member with a high temperature coefficient of electrical resistance, two terminals electroconductively joined to the ends of said member for leading electric current to and from said member, a flexible member of high thermal conductivity, a thin layer of electric insulation on one of said members, one of said members being tightly coiled around the other member to form a substantially solid composite element of high thermal and relatively low electrical conductivity and wound in the shape of two coaxial cones with a common base and with apexes of 90 degree angles.

4. A sensitive element for the measurement of heat exchange with a surrounding medium comprising: a flexible member with a high temperature coefficient of electrical resistance, two terminals electroconductively joined to the ends of said member for leading electric current to and from said member, a flexible member of high thermal conductivity, a thin layer of electric insulation on one of said members, one of said members being tightly coiled around the other member to form a substantially solid composite element of high thermal and relatively low electrical conductivity and wound in the shape of two coaxial cones with a common base and substantially equal apexes.

5. A sensitive element for the measurement of heat exchange with a surrounding medium, comprising an electric resistance wire member consisting of three electrically continuous parts of substantially equal length, surface area and thermal and electrical resistance characteristics, said parts being bent at right angles to each other in space, and being disposed substantially parallel to the three directions of a rectangular system of space coordinates.

6. A sensitive element for the measurement of heat exchange with a surrounding medium comprising: a flexible member with a high temperature coefficient of electrical resistance, two terminals electroconductively joined to the ends of said member for leading electric current to and from said member, a flexible member of high thermal conductivity, a thin layer of electric insulation [of] *on* one of said members, one of said members being tightly coiled around the other member to form a substantially solid composite element of high thermal and relatively low electrical conductivity, said composite element being subdivided along its length into three parts of substantially equal length, surface area and thermal and electrical characteristics, said parts bent at right angles to each other and substantially in parallel with three rectangular space coordinates.

7. A sensitive element for the measurement of fluid flow and velocity including a flexible combined intertwisted electrical and thermal conductor member shaped in the form of a conical coil having consecutive turns so spaced that their projection on a plane perpendicular to the cone axis forms a flexible spiral with interstices not smaller than the thickness of the conductor.

8. A sensitive element for the measurement of fluid flow and velocity comprising a flexible member having a high temperature coefficient of electrical resistance, a terminal electroconductively joined to each end of said member for leading electric current to and from said member, a flexible member of high thermal conductivity, a relatively thin layer of electric insulation on one of said members, one of said members being tightly coiled around the other to form a substantially solid composite element, said composite element being wound in the shape of a conical coil, with an apex of approximately 60 angular degrees and having consecutive turns so spaced that for a fluid moving in the direction of the axis of said cone, the free passage between the convolutions at least equals the thickness of the composite element.

9. A sensitive element for the measurement of heat exchange with a medium surrounding it, comprising a member with a high temperature coefficient of electrical resistance, a flexible member of high thermal conductivity, electrical insulation on one of said members thin enough to permit substantially unimpeded transmittance of heat, said member of high thermal conductivity being tightly wound around said first-named member to increase the surface area of the element and to control the amount of heat energy exchanged.

References Cited in the file of this patent or the original patent

UNITED STATES PATENTS

| | | |
|---|---|---|
| 1,156,638 | Simmons | Oct. 12, 1915 |
| 1,222,492 | Thomas | Apr. 10, 1917 |
| 1,304,687 | Kahn | May 27, 1919 |
| 2,321,846 | Obermaier | June 15, 1943 |